Oct. 11, 1966   L. F. URRY   3,278,334
ANODE LIMITED SEALED SECONDARY BATTERY
HAVING AN AUXILIARY ELECTRODE
Filed June 25, 1963

INVENTOR.
LEWIS F. URRY
BY John R. Doherty
ATTORNEY

United States Patent Office 3,278,334
Patented Oct. 11, 1966

3,278,334
ANODE LIMITED SEALED SECONDARY BATTERY HAVING AN AUXILIARY ELECTRODE
Lewis F. Urry, Parma, Ohio, assignor to Union Carbide Corporation, a corporation of New York
Filed June 25, 1963, Ser. No. 290,440
4 Claims. (Cl. 136—3)

This invention is directed to sealed secondary batteries. More specifically, the invention relates to sealed secondary batteries comprising an auxiliary electrode which operates to prevent excessive internal pressure and a pressure controlled switch adapted to maintain a minimum internal pressure.

It has long been an object of the battery industry to provide sealed rechargeable batteries in which the formation of gas pressure is inhibited to a degree sufficient to prevent rupture of the battery containers.

This goal has been partially achieved through the development of cathode limited batteries which operate on the oxygen overcharge principle. The electrodes employed in this system are so designed that the cathode reaches a state of full charge before the anode is fully charged so that only oxygen is evolved on overcharge. The oxygen thus evolved oxidizes the metal anode, thereby reducing the internal gas pressure in the battery container. While the oxygen overcharge system is advantageous in that it makes possible a sealed rechargeable battery, there are several inherent limitations which have prevented more widespread use of such batteries. For example, the anode must be made of a material which reacts rapidly with oxygen. Additionally, the cathode materials applicable to oxygen overcharge systems are limited to materials which do not deteriorate on repeated overcharging and which do not form soluble by products on overcharge. Moreover, such batteries must be operated in a semi-wet condition, i.e., with the electrolyte absorbed in a bibulous separator. This necessarily limits the electrolyte capacity and consequently the electrical capacity of the system. In addition, the oxygen overcharge system does not provide an efficient method for avoiding the pressure due to the evolution of hydrogen resulting from normal corrosion during use and storage.

In copending United States application Serial No. 249,743, filed on January 7, 1963, there is described an anode limited battery which operates on the hydrogen overcharge principle evolving hydrogen on overcharge. This cell avoids the aforementioned limitations of the oxygen overcharge system. In an anode limited system the anode is so designed as to reach a state of full charge before the cathode is fully charged. The hydrogen gas which is evolved on overcharge, and that hydrogen liberated by normal corrosion, is consumed by means of an auxiliary electrode which is in electrical contact with the cathode. A preferred form of the auxiliary electrode comprises a finely divided form of platinum metal deposited on a substrate of activated carbon having a porosity between about 25 and 35 percent.

The auxiliary electrode and the battery cathode constitute a circuit that allows the hydrogen gas to react with the cathode through the intermediate auxiliary electrode.

Batteries which operate on the hydrogen-overcharge principle are hereafter referred to as being anode limited.

The utilization of the hydrogen overcharge principle makes it unnecessary to be crtically selective of anode materials or the physical form of anode materials since the anode does not react directly with the evolved gas, i.e., the hydrogen. Moreover, since the anode reaches full charge capacity before the cathode it is now possible to use many common cathode depolarizers which could not be used in conjunction with the oxygen overcharge principle. For example, manganese dioxide is usable whereas if used in a cathode limited battery, soluble manganese salts are formed and the battery gradually deteriorates. The hydrogen overcharge principle makes possible the use of less expensive electrode materials such as lead, lead dioxide, and manganese dioxide. Another advantage accruing from the utilization of the hydrogen overcharge principle is that the battery does not require an anode which is substantially larger than the cathode. This effectively prevents deep discharge of the cathodic depolarizer. Furthermore, the hydrogen developed by normal corrosion is removed along with the hydrogen evolved during overcharge.

It has been found that the auxiliary electrode is subject to deterioration and resulting inoperativeness caused by becoming flooded with electrolyte. Flooding of the auxiliary electrode has been found to occur when the internal hydrogen pressure decreases below a certain critical level. The drop in the partial pressure of hydrogen caused by the operation of the auxiliary electrode-cathode couple causes electrolyte to be drawn into the pores of the auxiliary electrode, thus flooding the electrode and reducing its efficiency and operative life. It appears that whenever the reaction site on the auxiliary electrode is starved for the reacting gas, i.e., hydrogen, liquid is drawn towards the gas side of the electrode. The reaction site on the electrode surface is the liquid-gas-catalyst-conductor junction. The electrode is said to be starved for the reacting gas when the hydrogen arrival rate cannot match the rate at which hydrogen is being consumed at the reaction site.

It is an object of this invention to provide improved sealed secondary batteries which operate on the hydrogen overcharge principle.

It is another object of this invention to prolong the effective life of the auxiliary electrodes used in sealed secondary batteries which operate on the hydrogen overcharge principle.

It is a further object to prevent the flooding of auxiliary electrodes with electrolyte.

It is a further object to maintain a plentiful supply of hydrogen gas in contact with the auxiliary electrode.

These and other related objects are achieved by the invention which comprises a sealed secondary battery adapted to operate on the hydrogen overcharge principle and having provided therein a pressure controlled switch for breaking the electrical contact between the auxiliary electrode and the cathode when the hydrogen gas pressure in the battery reaches a predetermined minimum level below which the auxiliary electrode becomes flooded with electrolyte. The hydrogen consuming action of the auxiliary electrode is thus interrupted and flooding of the auxiliary electrode cannot occur. When the internal pressure increases again, due to the accumulation of hydrogen gas, the switch closes the circuit and the hydrogen consuming action of the auxiliary electrode is resumed.

Since the switch is not connected in the charging circuit of the battery, each cell of the battery is preferably equipped with its own auxiliary electrode and pressure switch to provide selective switch action without affecting the operation of the other cells.

It will be observed that the function of the herein described pressure controlled switch is not to interrupt or reduce the charging current. Rather the switch and auxiliary electrode combination provide a means for recombining the hydrogen gas as the gas is evolved. This provides more efficient battery charging since most rechargeable systems require prolonged charging in order to give a good stable charge to the electrodes.

Figure 1:
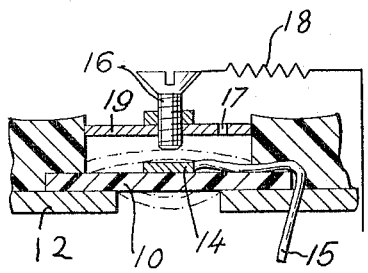
FIG. 1 is a sectional view of one embodiment of a pressure controlled switch in accordance with the invention.

Referring now to the drawing, FIG. 1 illustrates one embodiment of a pressure controlled switch comprising a gas impermeable diaphragm 10, for example, of plastic, butadiene rubber, polyethyene, polypropylene, and the like. The diaphragm 10 is cemented in place over a small aperture in the battery container 12. On top of this diaphragm is situated an electrically conductive member 14, suitably comprising a thin metal sheet. The electrical contact member 14 is connected with the auxiliary hydrogen-recombining electrode (not shown) through a lead 15. An adjustable screw 16 fitted through a plate 19, is connected through a resistance 18 to the cathode in the battery container. The adjustable screw 16 is so disposed as to contact the conductive member 14 when the diaphragm 10 is distended by hydrogen gas pressure in the battery container 12, thus completing a circuit between the cathode and the auxiliary electrode.

As shown in FIG. 1, the adjustable screw 16 provides a means of regulating the distance through which the pressure must move the diaphragm 10 before conductive member 14 made contact with the adjustable screw. The diaphragm 10 is open to the atmosphere through a hole 17 in supporting plate 19 so that the diaphragm may move freely in response to an increase in hydrogen gas pressure in the battery container. Alternatively, the supporting plate 19 may be constructed of a gas permeable material.

Figure 2:
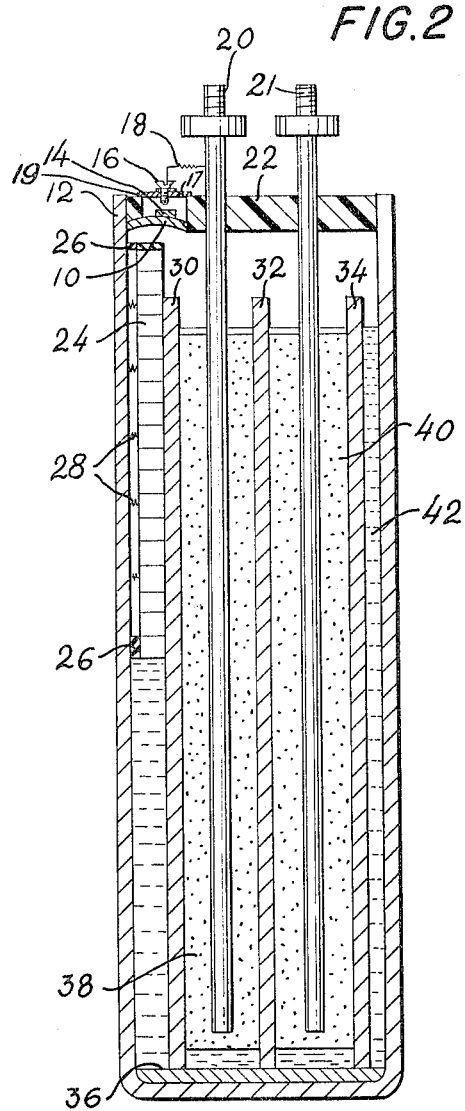
FIG. 2 is an elevational view of a cell incorporating another embodiment of the invention.

FIGURE 2 shows a complete battery embodying the principles of the invention. As shown, the battery comprises a container 12, provided with a pressure controlled switch and having therein an auxiliary electrode 24, an anode 40, a cathode 38, and an electrolyte 42 in contact with the anode and cathode. The diaphragm 10 of the pressure controlled switch is constructed of a thin metal sheet connected at one side to the metal cell container 12. Adjustable screw contact 16 is connected through resistor 18 to the cathode terminal 20 and is supported by closure member 19 and cell top closure 22 of an electrically nonconductive material. The hydrogen-recombing electrode 24 is positioned in the battery and held in place by support 26, which extends around the ends and sides of the recombining electrode so as to form a liquid-free space between the auxiliary electrode 24 and the container wall, thus providing access to the electrode surface for the hydrogen gas. Additional support and electrical contact is provided by supporting members 28. At least the top portion of support 26 must be gas permeable and liquid impermeable. Separators 30, 32, 34 and 36 are placed so as to prevent contact between recombining electrode 24, cathode 38 and anode 40 and between the latter two electrodes and the bottom of the metal container. Electrolyte 42 is contained in the inner cell spaces and in the separators.

Figure 3:
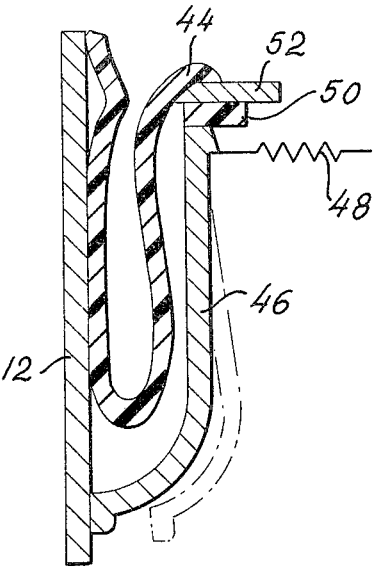
FIG. 3 is a sectional view of another embodiment of the invention.

FIGURE 3 shows another modification of the invention. An elastic gas-impermeable bag 44 (e.g., of plastic) is situated inside the cell but is open to the atmosphere. The bag is firmly attached to the top closure 52 and the container wall 12. When the internal gas pressure is greater than atmospheric pressure, the bag 44, collapses and the circuit is completed between cathode and recombining electrode by means of contact member 46 through resistor 48. An insulating washer 50 may be used to prevent contact between member 46 and top closure 52 when the top closure is metallic. In this version, the auxiliary electrode is in contact with the cell container 12. When the hydrogen produced in the battery has been consumed to the point where the internal pressure is less than atmospheric pressure, the bag 44 expands and the circuit is broken by the outward movement of the contact member 46 as shown by the dotted lines.

During cell assembly a condition is established wherein at atmospheric pressure the atmosphere within the cell is over the 50 percent hydrogen level established as the safe operating level for the gas electrode. As added insurance an essentially pure hydrogen atmosphere was set up. This is accomplished by assembling the cell with a charge negative (anode) and a discharged positive (cathode). The cell is charged with a vent open so that the hydrogen formed can escape and carry air with it, until the desired state of charge of the cathode is reached. The vent is then closed and any additional charging raises the internal gas pressure above atmospheric pressure to the point where the switch closes and recombination via the gas electrode is accomplished.

In the practice of this invention, a cell having a zinc anode, KOH electrolyte, and a silver oxide depolarizer was equipped with a porous carbon auxiliary electrode (catalyzed with a small amount of platinum family metal) and a pressure-controlled switch similar to that shown in FIGURES 1 and 2. For experimental purposes, the cell was connected to a gas pressure gauge and a milliammeter was situated between the switch and the auxiliary electrode. When the gas pressure was observed to decrease below that value for which the switch was set during the charging operation, the circuit between the cathode and auxiliary electrode was broken, as could be observed on the milliammeter. When the gas pressure increased again, the switch automatically closed the circuit and recombination of hydrogen gas was resumed as before. The switch functioned continuously in this manner until the cell was completely charged.

It will be obvious to those skilled in the art that various structural modifications of the pressure controlled switch may be employed without departing from the principle of the invention. These modifications extend to both the design of the various elements and to the materials of construction employed.

What is claimed is:

1. An anode limited rechargeable battery operating on a hydrogen cycle, comprising; a sealed container having therein an anode, a cathode, a porous auxiliary electrode, and an electrolyte in contact with said anode, cathode, and porous auxiliary electrode, a pressure controlled switch responsive to the internal pressure within said sealed container, said switch comprising an elastic gas-impermeable diaphragm having a first contact member disposed over an aperture in said container and a supporting member supporting a second contact member, the outer surface of said gas-impermeable diaphragm being exposed to atmospheric pressure and the inner surface being exposed to the internal pressure of the battery; said auxiliary electrode consisting essentially of a substrate of activated carbon having a porosity of between about 25 and 35 percent and having deposited thereon a finely divided platinum metal, and circuit means connecting said auxiliary electrode with said cathode through said pressure controlled switch, whereby said pressure controlled switch connects said auxiliary electrode to said cathode when the internal pressure of the battery is in excess of a predetermined pressure and disconnects said auxiliary electrode from said cathode when the internal pressure is below said predetermined pressure.

2. The battery of claim 1 wherein said supporting member is an elastic gas-permeable diaphragm.

3. The battery of claim 2 wherein said second contact member is adjustable with respect to said first contact member and comprises a threaded member.

4. An anode limited rechargeable battery operating on a hydrogen cycle, comprising; a sealed container having a top closure member provided with an aperture therein, said container having therein an anode, a cathode, a porous auxiliary electrode and an electrolyte in contact with said anode, cathode, and porous auxiliary electrode; said auxiliary electrode consisting essentially of a substrate of activated carbon having a porosity of between about 25 and 35 percent and having deposited thereon a finely divided platinum metal, circuit means connecting said auxiliary electrode with said cathode and including a switch arm pivotally mounted to said top closure member adjacent said aperture, and an elastic gas-impermeable bag disposed in the aperture open to the atmosphere, said bag engaging said switch arm so that the expansion of said bag due to the difference between the atmospheric pressure and the internal pressure of said container causes said switch arm to move thereby opening and closing the circuit between said auxiliary electrode and said cathode.

References Cited by the Examiner
UNITED STATES PATENTS

| | | | |
|---|---|---|---|
| 2,578,027 | 12/1951 | Tichenor | 136—6 XR |
| 2,651,669 | 9/1953 | Neumann | 136—182 |
| 3,080,440 | 3/1963 | Ruetschi et al. | 136—3 |
| 3,081,366 | 3/1963 | Belove | 136—6 |

WINSTON A. DOUGLAS, *Primary Examiner.*

MURRAY TILLMAN, *Examiner.*

B. J. OHLENDORF, *Assistant Examiner.*